(12) United States Patent
Yamaguchi et al.

(10) Patent No.: US 12,483,519 B2
(45) Date of Patent: Nov. 25, 2025

(54) TRANSMISSION SYSTEM, TRANSMISSION METHOD AND TRANSMISSION PROGRAM

(71) Applicant: NTT, Inc., Tokyo (JP)

(72) Inventors: Takuro Yamaguchi, Musashino (JP);
Takahiro Yamaguchi, Musashino (JP);
Daisuke Shirai, Musashino (JP);
Yasuhiro Mochida, Musashino (JP)

(73) Assignee: NTT, Inc., Tokyo (JP)

( * ) Notice: Subject to any disclaimer, the term of this patent is extended or adjusted under 35 U.S.C. 154(b) by 199 days.

(21) Appl. No.: 18/274,558

(22) PCT Filed: Feb. 8, 2021

(86) PCT No.: PCT/JP2021/004560
§ 371 (c)(1),
(2) Date: Jul. 27, 2023

(87) PCT Pub. No.: WO2022/168306
PCT Pub. Date: Aug. 11, 2022

(65) Prior Publication Data
US 2024/0098041 A1 Mar. 21, 2024

(51) Int. Cl.
*H04L 49/9023* (2022.01)
*H04L 1/20* (2006.01)
*H04L 49/9005* (2022.01)

(52) U.S. Cl.
CPC ......... *H04L 49/9023* (2022.05); *H04L 1/205* (2013.01); *H04L 49/9005* (2013.01)

(58) Field of Classification Search
CPC . H04L 49/9023; H04L 1/205; H04L 49/9005; H04L 47/283
See application file for complete search history.

(56) References Cited

U.S. PATENT DOCUMENTS

2003/0152093 A1* 8/2003 Gupta ............... H04L 47/30
370/516
2007/0211704 A1* 9/2007 Lin ................. G10L 19/167
704/E19.048

(Continued)

FOREIGN PATENT DOCUMENTS

JP 2008244894 10/2008
JP 2014135685 7/2014

(Continued)

OTHER PUBLICATIONS

[No Author Listed], "SMPTE Standard: 2017 Professional Media Over Managed IP Networks: Uncompressed Active Video," Society of Motion Picture and Television Engineers, Sep. 2017, SPMTE ST 2110-20:2017, 22 pages.

(Continued)

*Primary Examiner* — Wutchung Chu
(74) *Attorney, Agent, or Firm* — Fish & Richardson P.C.

(57) ABSTRACT

A transmission system includes a calculation unit that calculates a jitter pattern sequence of a plurality of packets transmitted by a transmission device via a network using a transmission interval of the plurality of packets and a difference between arrival times at which the packets arrive at a reception device, a generation unit that inputs the jitter pattern sequence to a first learning model to generate a state index indicating a state of the network, and a buffer estimation unit that determines a buffer size of a reception buffer of the reception device based on the state index.

13 Claims, 8 Drawing Sheets

(56) References Cited

U.S. PATENT DOCUMENTS

| | | | |
|---|---|---|---|
| 2019/0164518 A1* | 5/2019 | Dimitrov | G09G 5/393 |
| 2020/0193213 A1* | 6/2020 | Cao | G06F 18/214 |
| 2020/0275278 A1 | 8/2020 | Hanawa et al. | |
| 2021/0084093 A1* | 3/2021 | Gunnalan | G06N 20/20 |
| 2024/0098041 A1* | 3/2024 | Yamaguchi | H04L 1/205 |
| 2024/0244216 A1* | 7/2024 | Sakthivel | H04N 19/132 |

FOREIGN PATENT DOCUMENTS

| | | |
|---|---|---|
| JP | 20198554 | 1/2019 |
| JP | 2020135816 | 8/2020 |

OTHER PUBLICATIONS

[No Author Listed], "SMPTE Standard: 2017 Professional Media Over Managed IP Networks: Traffic Shaping and Delivery Timing for Video," Society of Motion Picture and Television Engineers, Nov. 2017, SPMTE ST 2110-21:2017, 17 pages.

* cited by examiner

TRANSMISSION SYSTEM, TRANSMISSION METHOD AND TRANSMISSION PROGRAM

CROSS-REFERENCE TO RELATED APPLICATIONS

This application is a National Stage application under 35 U.S.C. § 371 of International Application No. PCT/JP2021/004560, having an International Filing Date of Feb. 8, 2021.

The disclosure of the prior application is considered part of the disclosure of this application, and is incorporated by reference in its entirety into this application.

TECHNICAL FIELD

The present invention relates to a transmission system, a transmission method, and a transmission program.

BACKGROUND ART

SMPTE ST2110 is a system for transmitting uncompressed video and audio through a network. SMPTE ST2210-20 describes a method of storing video essence in a payload of a Real-time Transport Protocol (RTP) packet and transmitting the video essence (NPL 1). In uncompressed video transmission, the number of packets per frame is constant as long as a pixel mapping method to RTP packets and video parameters do not change.

In SMPTE ST2210-21, a desirable transmission timing model of a RTP packet in non-compressed video transmission is described (NPL 2). In the Linear model, the RTP packet transmission interval is always constant. The gapped model is a timing model based on a serial digital interface (SDI), and transmits RTP packets at fixed intervals only in a period corresponding to an effective pixel of the SDI in each frame. The reception device is designed based on a transmission timing model.

CITATION LIST

Non Patent Literature

[NPL 1] SMPTE ST 2110-20: 2017 Professional Media Over Managed IP Networks: Uncompressed Active Video

[NPL 2] SMPTE ST 2110-21: 2017 Professional Media Over Managed IP Networks: Traffic Shaping and Delivery Timing for Video

SUMMARY OF INVENTION

Technical Problem

It is known that various problems occur in transmission through a network depending on the state of the network. For example, the video can be reproduced when a fixed amount of packets are completed, but a delay due to the network state occurs, and the time until the fixed amount of packets are completed changes. On the other hand, there is provided a buffer which is a waiting time until the amount of reproducible packets is completed. In a conventional transmission device, a constant value is set in a buffer to absorb time fluctuation until data is completed in a congested state.

However, since the same value as the congestion state is applied to the buffer even in the stable state of the network, a longer delay than necessary is generated. Such a delay is an obstacle in a case where real-time performance is required, such as in on-line communication in a Web conference, remote medical care, and control by video such as automatic driving.

Since the transmission standard SMPTE ST2110 transmits video/audio signals or the like through a network instead of the coaxial cable, it is desirable to suppress delay on the network as much as possible when shifting from the coaxial cable to the network.

The present invention has been designed in consideration of the circumstances described above, and an object of the present invention is to improve transmission performance according to network conditions.

Solution to Problem

In order to achieve the above object, one aspect of the present invention is a transmission system including a calculation unit that calculates a jitter pattern sequence of a plurality of packets transmitted by a transmission device via a network using a transmission interval of the plurality of packets and a difference between arrival times at which the packets arrive at a reception device, a generation unit that inputs the jitter pattern sequence to a first learning model to generate a state index indicating a state of the network, and a buffer estimation unit that determines a buffer size of a reception buffer of the reception device based on the state index.

One aspect of the present invention is a transmission method performed by a transmission system, the method including performing a step of calculating a jitter pattern sequence of a plurality of packets transmitted by a transmission device via a network using a transmission interval of the plurality of packets and a difference between arrival times at which the packets arrive at a reception device, a step of inputting the jitter pattern sequence to a first learning model to generate a state index indicating a state of the network, and a step of determining a buffer size of a reception buffer of the reception device based on the state index.

One aspect of the present invention is a transmission program for causing a computer to function as the transmission system.

Advantageous Effects of Invention

According to the present invention, transmission performance can be improved according to network conditions.

DESCRIPTION OF EMBODIMENTS

Embodiments of the present invention will be described below with reference to the drawings.

First Embodiment

Figure 1:
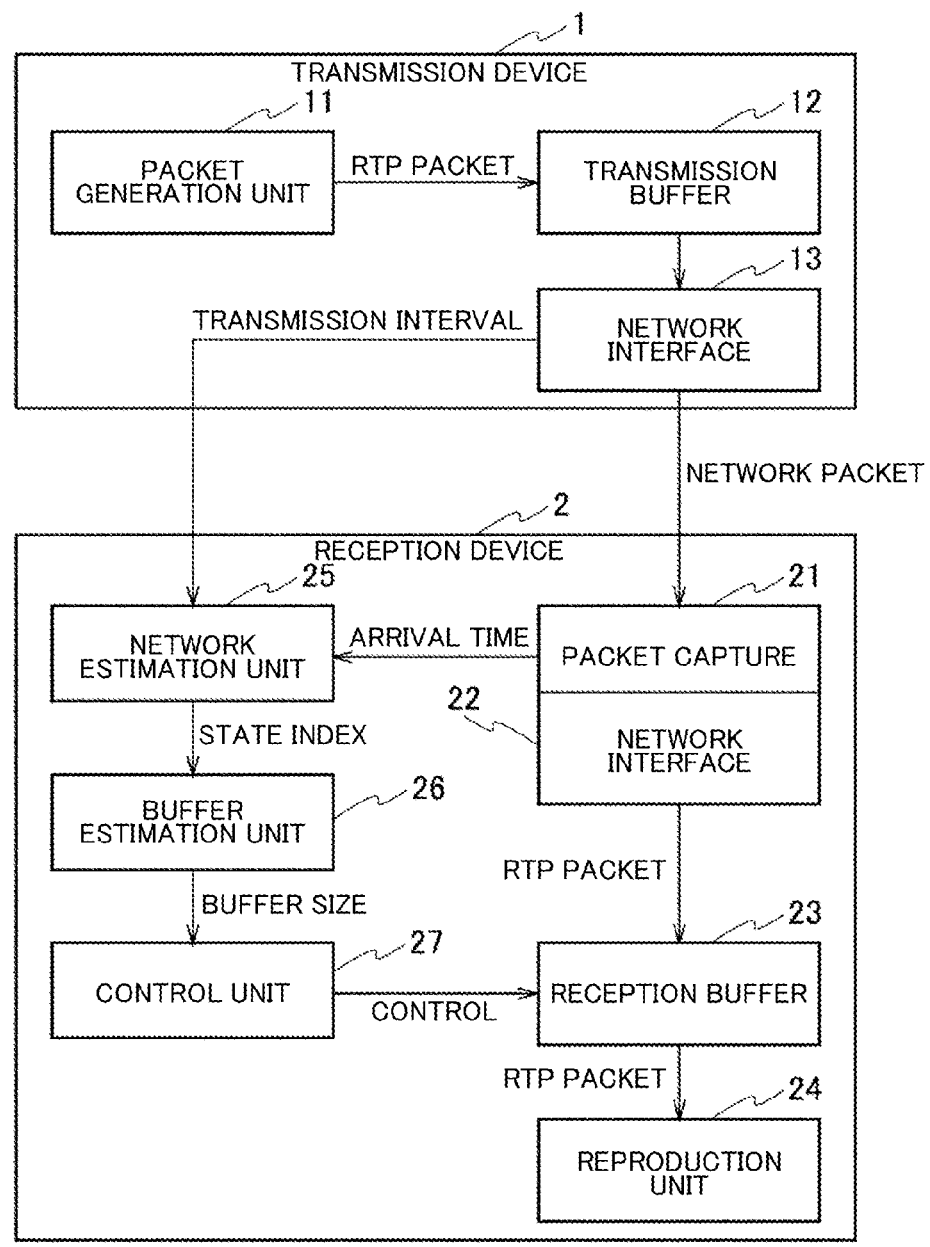
FIG. 1 is a block diagram illustrating a configuration example of a transmission system of a first embodiment.

FIG. 1 is a block diagram illustrating a configuration example of a transmission system according to a first embodiment. In the present embodiment, the transmission interval of RTP packets transmitted by a transmission device 1 is fixed (known) in accordance with a known rule determined by the transmission method. In other words, the present embodiment is applied to a transmission scheme having a fixed transmission interval such as video transmission by SMPTE ST 2110. In this case, only a reception device 2 captures the packet.

Although the RTP packet is used in the present embodiment, the present invention is not limited to the RTP packet, and packets other than the RTP packet may be used.

The illustrated transmission system includes the transmission device 1 and the reception device 2, and the transmission device 1 and the reception device 2 are connected via a network (not shown).

The transmission device 1 includes a packet generation unit 11, a transmission buffer 12, and a network interface 13. The packet generation unit 11 generates an RTP packet and outputs the packet to the network interface 13 via the transmission buffer 12. The network interface 13 stores the RTP packet in a network protocol packet (hereinafter referred to as "network packet") and transmits the packet to the reception device 2 via the network. The network interface 13 of the present embodiment transmits the transmission interval of the RTP packet to the network estimation unit 25 of the reception device 2.

The reception device 2 includes a packet capture 21, a network interface 22, a reception buffer 23, a reproduction unit 24, a network estimation unit 25, a buffer estimation unit 26, and a control unit 27.

The packet capture 21 collects a network packet transmitted via a network, and outputs an arrival time when the network packet arrives at the reception device 2 to the network estimation unit 25.

The network interface 22 extracts an RTP packet from the received network packet, and outputs the RTP packet to the reproduction unit 24 via the reception buffer 23. The reproduction unit 24 extracts and arranges a data part of the RTP packet to reproduce the RTP packet as a video.

The network estimation unit 25 generates a state index indicating a state of a network between the transmission device 1 and the reception device 2 using a transmission interval and an arrival time of the packet, and outputs the state index to the buffer estimation unit 26. Processing performed in the network estimation unit 25 will be described later.

The buffer estimation unit 26 determines a buffer size of the reception buffer 23 of the reception device 2 based on the state index. The buffer estimation unit 26 may input the state index to a learning model (second learning model) for buffer estimation to determine the buffer size of the reception buffer 23. The buffer estimation unit 26 may acquire an observation value output from the reception buffer 23, and determine a buffer size of the reception buffer 23 using a deviation between the observation value or an estimation value estimated from the observation value and the state index.

The control unit 27 updates the reception buffer 23 to the buffer size determined by the buffer estimation unit 26.

The RTP packet and the network packet may be described later as packets below.

Figure 2:
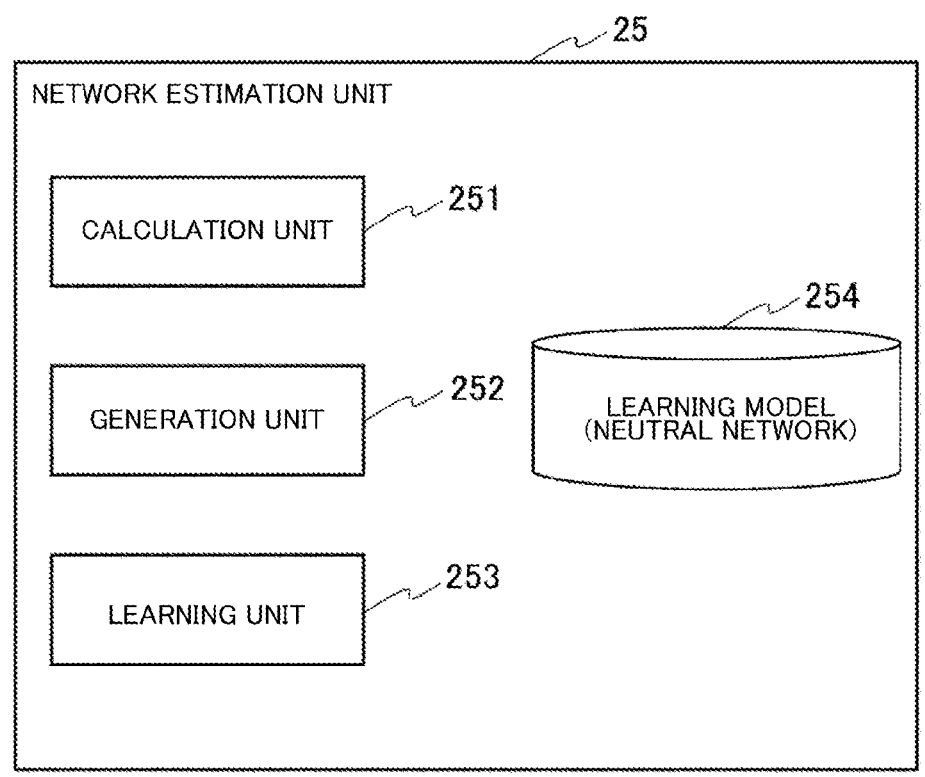
FIG. 2 is a block diagram illustrating a configuration of a network estimation unit.

FIG. 2 is a configuration diagram illustrating a configuration of the network estimation unit 25. The illustrated network estimation unit 25 includes a calculation unit 251, a generation unit 252, a learning unit 253, and a learning model 254.

The calculation unit 251 generates a jitter pattern sequence of a plurality of packets transmitted by the transmission device 1 via a network, using a transmission interval of the plurality of packets and a difference between arrival times (arrival times) at which the packets arrive at the reception device 2. Specifically, the calculation unit 251 acquires arrival times of a plurality of packets continuing in time series from the packet capture 21, and calculates a difference between the arrival times of the continuous packets.

The generation unit 252 inputs the jitter pattern sequence to a learning model 254 (first learning model) to generate a state index indicating a state of the network.

The learning unit 253 generates the learning model 254 by machine learning. The learning model 254 may be a neural network generated by deep learning. The deep learning may be unsupervised learning or supervised learning. Specifically, the learning unit 253 may generate a neural network by performing unsupervised learning using a slack time zone of a network (path) as learning data, or may generate a neural network by performing supervised learning in which labels are attached to a transmission interval collected from the transmission device 2 and a plurality of arrival times collected from the reception device 2.

In the present embodiment, although the network estimation unit 25 is provided in the reception device 2, the network estimation unit 25 may be provided in the external device instead of the reception device 2.

Next, the basic flow of video transmission and reproduction in the present embodiment will be described.

In the transmission device 1, the packet generation unit 11 divides a video stream to be transmitted into RTP packets according to SMPTE ST 2110, and outputs the RTP packets to the network interface 13 via the transmission buffer 12. The network interface 13 stores the RTP packets in an arbitrary network protocol packet and transmits the packet to the reception device 2 over the network.

As the network protocol, User Datagram Protocol (UDP)/Internet Protocol (IP)/Ethernet, or the like may be used. The type of the network is not limited. The network may use wavelength paths to which a wavelength is assigned exclusively.

In the reception device 2, the network interface 22 extracts an RTP packet from a network packet received via a network, and outputs the RTP packet to the reproduction unit 24 via the reception buffer 23. The reproduction unit 24 extracts and arranges the data part of the RTP packet to reproduce the RTP packet as a video.

The transmission system of the present embodiment controls transmission according to the state of the network in addition to the video transmission and reproduction, and improves transmission performance.

Figure 3:
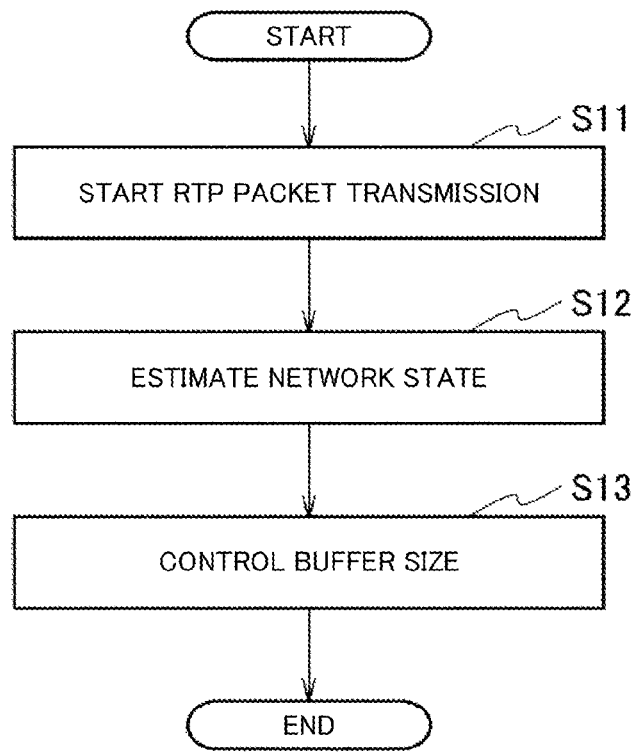
FIG. 3 is a flowchart illustrating transmission control processing.

FIG. 3 is a flowchart illustrating a processing of transmission control.

The transmission device 1 starts transmission of the RTP packet (S11). At that time, the network interface 13 of the transmission device 1 transmits transmission interval information indicating a transmission interval of a prescribed RTP packet to the network estimation unit 25. In the reception device 2, the packet capture 21 sequentially collects network packets arriving at the network interface 22, and outputs the arrival time of each network packet to the network estimation unit 25.

The network estimation unit 25 estimates the state of the network using the transmission interval information acquired from the transmission device 1 and the arrival time acquired from the packet capture 21, and generates a state index indicating the state (S12).

First, the calculation unit 251 calculates a packet arrival time difference using the arrival time notified from the reception device 2. Specifically, the calculation unit 251 calculates an arrival time difference using a difference between arrival times of two consecutive packets. Then, the generation unit 252 calculates a jitter pattern sequence using the transmission interval and the arrival time difference. Specifically, the calculation of the jitter pattern sequence is as follows.

A sequence of ideal RTP packet transmission times for one frame based on the transmission timing model is defined as $T_{ideal}(k)$. k is the index of the RTP packet in one frame, and $0 \leq k \leq N-1$, where N is the number of RTP packets per frame.

When the first RTP packet transmission time is set to 0, $T_{ideal}(k)=C*K$. At this time, the packet transmission interval between the k-th packet and the (k−1)-th packet is as follows.

$$\Delta T_{ideal}(k)=T_{ideal}(k)-T_{ideal}(k-1)=C.$$

The calculation unit 251 determines a head packet of a frame by a packet whose time stamp is switched, and by giving marker information. The transmission device 1 notifies the network estimation unit 25 of a transmission interval C of the RTP packet.

The transmission device 1 may notify the transmission interval C by giving the transmission interval C to the RTP packet at the start of transmission as the notification timing. Alternatively, it is conceivable that a default value of the transmission interval C is set in advance in the network estimation unit 25, and only in the case of the transmission interval C different from the default value, the transmission device 1 notifies the network estimation unit 25 of the transmission interval C.

The packet capture 21 of the reception device 2 obtains a packet arrival time sequence $T_{RX}(k)$ corresponding to one frame and $0 \leq k \leq N-1$. The calculation unit 251 calculates an arrival time difference using a difference between arrival times of two consecutive packets. The arrival time difference is as follows.

$$\Delta T_{RX}(k)=T_{RX}(k)-T_{RX}(k-1)$$

The calculation unit 251 defines a jitter pattern using the difference of the transmission delay. The jitter pattern of the present embodiment is, for example, as follows.

$$J_1(k)=(T_{RX}(k)-T_{ideal}(k))-(T_{RX}(k-1)-T_{ideal}(k-1))=(T_{RX}(k)-T_{RX}(k-1))-(T_{ideal}(k)-T_{ideal}(k-1))=\Delta T_{RX}(k)-C$$

The calculation unit 251 performs the above calculation for a plurality of packets to generate a time-series jitter pattern sequence. As described above, since the jitter pattern can be calculated by the relative time in the reception device 2, it can be seen that the time synchronization between the transmission device 1 and the reception device 2 is not required.

The calculation unit 251 of the present embodiment calculates a jitter pattern based on a transmission interval and an arrival time difference between two consecutive packets, but increases an interval between packets to be sampled, or an average of delay differences of a plurality of packets may be taken.

Next, the generation unit 252 generates a state index based on the jitter pattern sequence. First, the generation unit 252 performs preprocessing for the jitter pattern sequence such as a descending order sorting, an absolute value processing, feature quantity extraction and frequency. The generation unit 252 inputs the pre-processed jitter pattern sequence to a neural network (learning model) generated by deep layer learning, for example, and acquires a state index output by the neural network. The neural network is learned so that the optimum size of the reception buffer 23 is outputted for the inputted jitter pattern sequence.

As the structure of the neural network used for learning, simple full coupling, CNN, and RNN as time-series data can be used. As for the weight used for learning, there are cases where learning is performed for each route of the network, and a case where the weight learned beforehand is used.

In some cases, deep layer learning is performed for each route, transmission is performed for each route without transmission control for a certain period of time and data obtained there is used to make the neural network learn from the beginning, a weight learned in advance is used as it is for the neural network, and, the weight learned in advance is applied to a neural network to be operated, and adjustment and re-learning are performed with a small amount of data.

In a case of learning or re-learning the weight from the beginning, the learning unit 253 may acquire the maximum jitter (delay time) and the network state (congested state, quiet state) from the observed value (actual operation data) in the reception buffer 23 and may use the acquired data for learning of the neural network.

As the state index outputted from the neural network, for example, an index indicating the degree of congestion such as a time zone, traffic volume, and the number of simultaneous connection terminals can be considered. When the state index is applied to the optimization of the buffer size, since the reception buffer 23 affects the minimum waiting time corresponding to the state of the network, the predicted maximum jitter, the continuity of the current state (congestion state or slack state), or the like are also included. The continuity possibility of the current state means the possibility/probability of the occurrence of state transition.

In the case of performing transmission control by optimizing the buffer size, the buffer estimation unit 26 receives the state index from the network estimation unit 25, and determines the optimum buffer size using the state index. The control unit 27 updates the reception buffer 23 with the determined buffer size (S13).

The buffer estimation unit 26 may determine the buffer size by feeding back the observation value from the reception buffer 23. In the case of feedback control, the buffer estimation unit 26 may acquire an observation value output from the reception buffer 23, and determine a buffer size using a deviation (difference) between the observation value or an estimation value of the reception buffer 23 estimated from the observation value and the state index. The observed values are, for example, the actual maximum jitter, the degree of buffer filling, the presence or absence of packet loss, and the like.

Specifically, the buffer estimation unit 26 may calculate a deviation between an actual maximum jitter as an observation value and a maximum jitter of the state index, and determine a buffer size based on the calculated deviation. The buffer estimation unit 26 estimates whether state transition occurs due to the buried state of the buffer of the observation value and the occurrence of packet loss, adjusts the buffer size according to the route of the actual network, and the control accuracy of the buffer size may be improved.

Further, the buffer estimation unit 26 may determine the buffer size using a neural network (learning model) generated by the enhanced learning. Specifically, the buffer estimation unit 26 may input the state index output from the network estimation unit 25 to the neural network, and determine the buffer size output by the neural network as the size of the reception buffer 23.

The neural network learns so as to output the optimum size of the reception buffer using the observation value (actual operation data) of the reception buffer 23 actually operated to the specific route of the network. In this case, the learning of the weight may be performed within a predetermined period of time such as the buffer estimation unit 26 in the reception device 2. Alternatively, only data collection may be performed in the reception device 2, the collected data may be transmitted to the learning unit 253 installed in a device outside the reception device 2, and the updated weight may be returned to the reception device 2 to update the neural network provided in the buffer estimation unit 26.

The buffer estimation unit 26 may determine a stepwise buffer size in accordance with the state index output from the network estimation unit 25. Specifically, a threshold value for the state index may be set, and a stepwise buffer size may be set according to the state.

Figure 4:
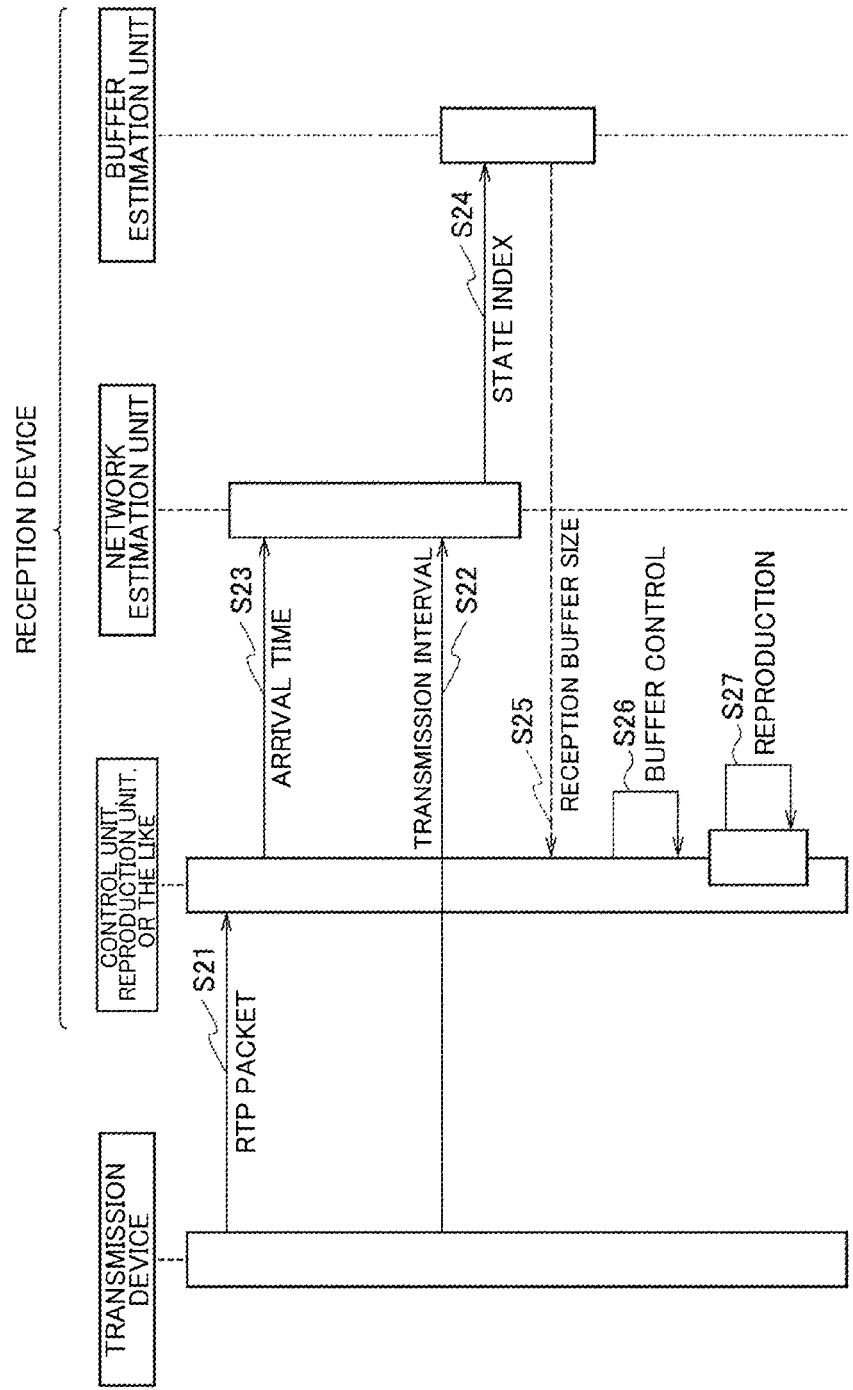
FIG. 4 is a sequence diagram illustrating an operation of the transmission system.

FIG. 4 is a sequence diagram illustrating processing of the transmission system of the present embodiment.

The transmission device 1 transmits the packet to the reception device 2 (S21). The transmission device 1 transmits the transmission interval of the packet to the network estimation unit 25 (S22).

The reception device 2 transmits the arrival time of the packet to a network estimation unit 25 (S23). The network estimation unit 25 calculates a jitter pattern sequence using the transmission interval and the arrival time, acquires a state index of the network by inputting the jitter pattern sequence to a learning model, and outputs the state index to the buffer estimation unit 26 (S24).

The buffer estimation unit 26 determines the buffer size of the reception buffer 23 using the state index, and outputs the buffer size to the control unit 27 (S25). The control unit 27 updates the reception buffer 23 with the buffer size output from the buffer estimation unit 26 (S26). The reproduction unit 24 reproduces the updated packet stored in the reception buffer 23 as a video (S27).

Figure 5:
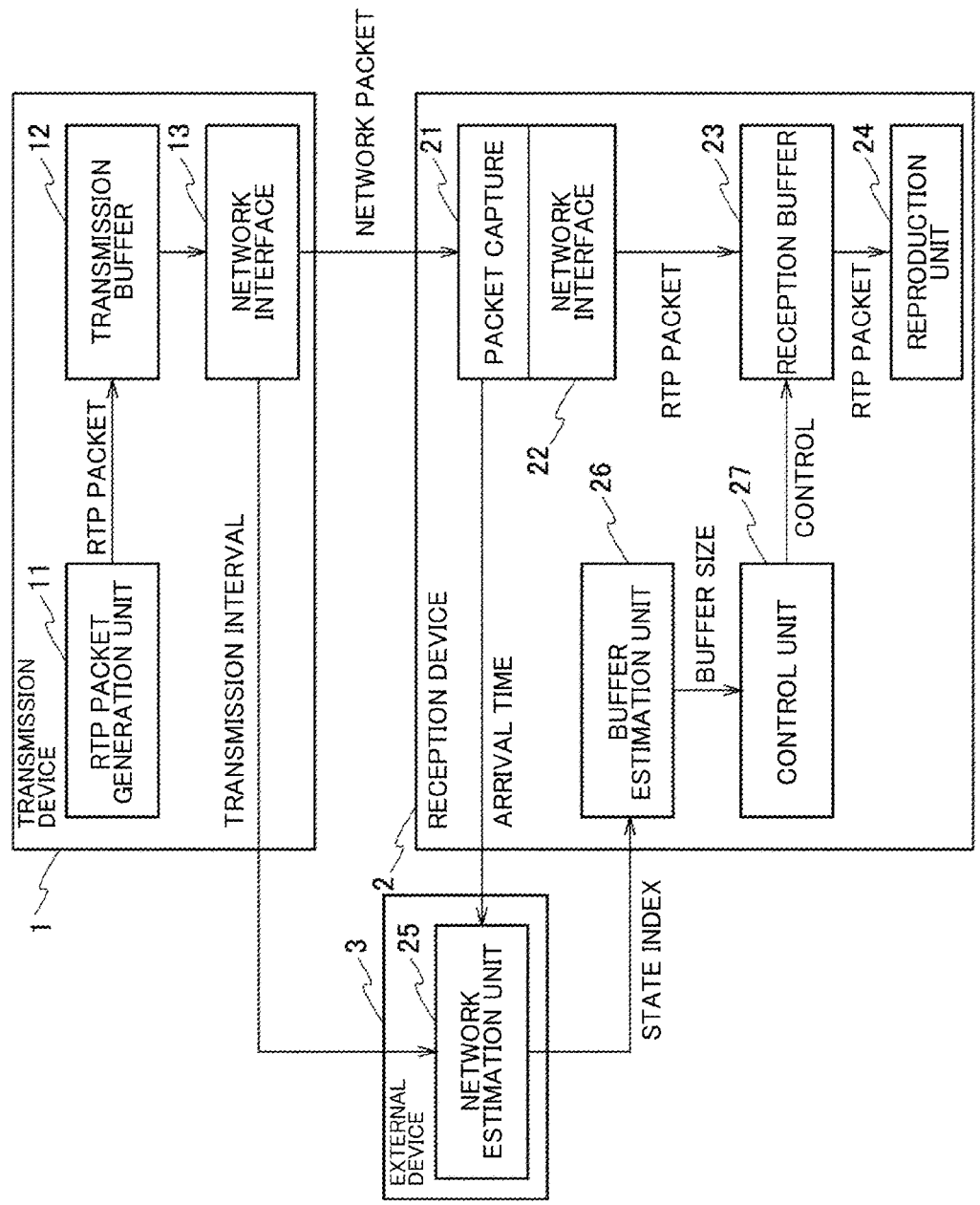
FIG. 5 is a block diagram illustrating a configuration example of the transmission system of a modification example of the first embodiment.

FIG. 5 shows a configuration example of the transmission system of to a modification example of the first embodiment. In this modification example, the network estimation unit 25 is provided not in the reception device 2 but in the external device 3. The others are the same as the first embodiment.

Second Embodiment

Figure 6:
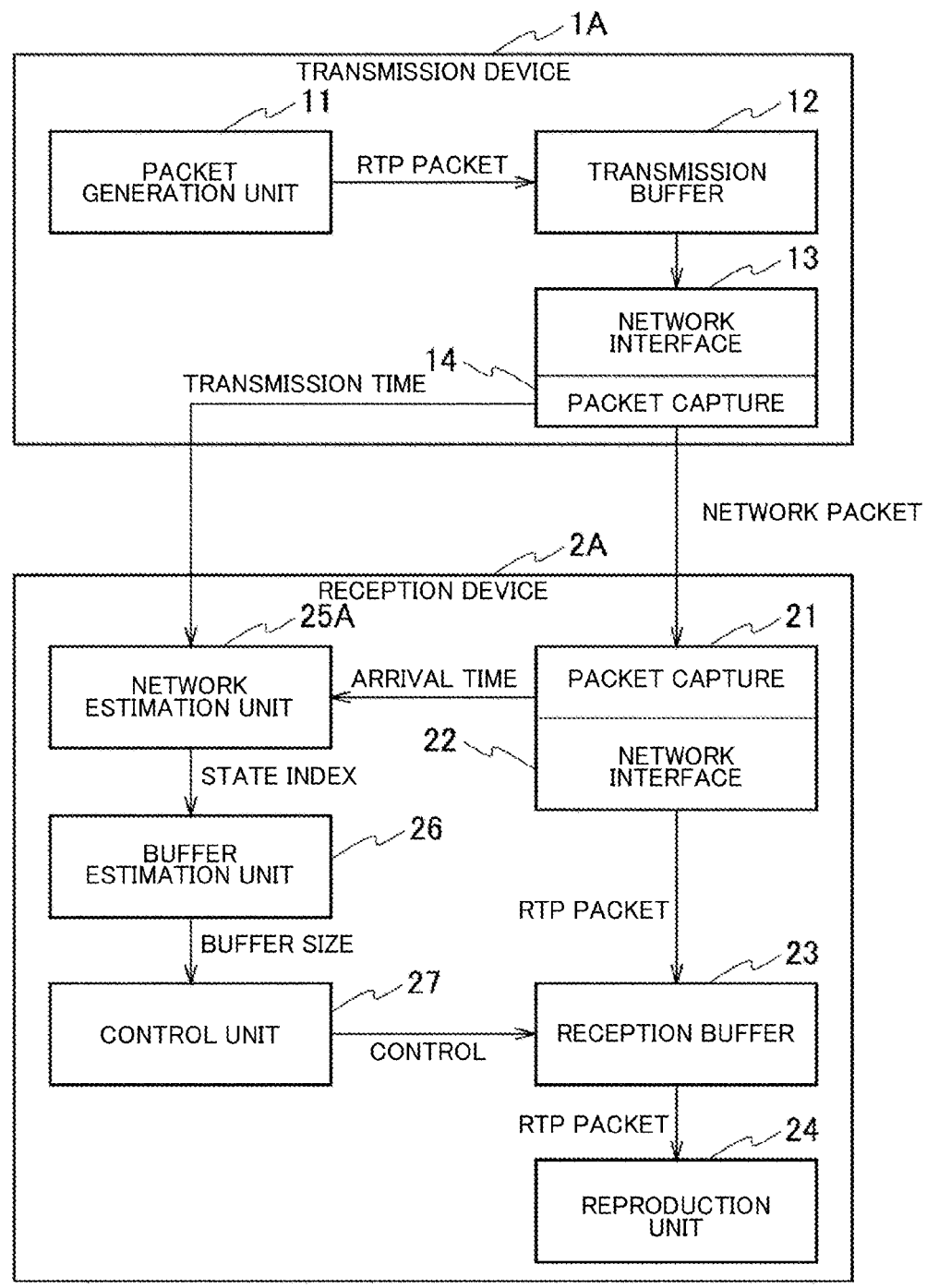
FIG. 6 is a diagram illustrating a configuration example of the transmission system of a second embodiment.

FIG. 6 is a system configuration diagram illustrating a configuration example of a transmission system of a second embodiment. In this embodiment, it is an unknown transmission system in which the transmission interval of packets transmitted by the transmission device 1A does not conform to a specific rule and dynamically fluctuates. In this case, the transmission device 1A and a reception device 2A perform packet capture. Also in the present embodiment, it is not necessary to perform time synchronization between the transmission device 1A and the reception device 2A.

The transmission system of the present embodiment illustrated in the figure is provided with the transmission device 1A and the reception device 2A, and the transmission device 1A and the reception device 2A are connected through a network. The transmission device 1A of the present embodiment is different from the first embodiment in that it is provided with a packet capture 14, and the others are the same as the transmission device 1 of the first embodiment. The packet capture 14 collects a network packet transmitted from the network interface 13 and transmits a transmission time (transmission time) of the network packet to the network estimation unit 25.

In the reception device 2A, unlike the first embodiment, a network estimation unit 25A (calculation unit) collects transmission times of a plurality of network packets from the transmission device 1, and calculates a difference between transmission times of continuous network packets as a transmission interval, and the rest is the same as that of the reception device 2 of the first embodiment. As illustrated in FIG. 2, the network estimation unit 25A of the present embodiment also includes the calculation unit 251, the generation unit 252, the learning unit 253, and the learning model 254.

In this embodiment, a packet transmission time series $T_{observed}(k)$ of the transmission device 1A does not have a fixed transmission interval. The information on the transmission side transmitted to the network estimation unit 25 is the transmission time of the packet obtained by the packet capture 14.

Further, the sequence $T_{observed}(K)$ may be formed in units of frames by adding the time stamp and marker information of the leading packet as in the first embodiment. Alternatively, a specific number of packets may be set, an arbitrary packet may be set as the head, and the number of packets set from the head may be processed as one series. However, when k is an index of RTP packets in a frame and the number of packets to be estimated is N, $0 \leq k \leq N-1$ is satisfied.

At this time, the sequence of packet transmission intervals (transmission intervals) between the k-th packet and the (k−1)-th packet is as follows.

$$\Delta T_{observed}(k) = T_{observed}(k) - T_{observed}(k-1)$$

The network estimation unit 25A calculates the packet transmission interval sequence $\Delta T_{observed}(k)$. The $\Delta T_{observed}(k)$ allows the network estimation unit 25A to have the required number of data at the timing of estimating the state of the network. As the transmission timing of the transmission time by the transmission device 1A, it is considered that transmission is performed as given information at the time of packet transmission and that transmission is performed collectively at the stage of completing transmission of one to several series.

Assuming that the packet arrival time sequence on the reception device 2 side is $\Delta T_{RX}(K)$ as in the first embodiment, the packet arrival interval is as follows.

$$\Delta T_{RX}(k) = T_{RX}(k) - T_{Rx}(k-1)$$

Therefore, the jitter pattern of the present embodiment is as follows.

$$J_2(k) = (T_{RX}(k) - T_{observed}(k)) - (T_{RX}(k-1) - T_{observed}(k-1)) = (T_{RX}(k) - T_{RX}(k-1)) - (T_{observed}(k) - T_{observed}(k-1)) = \Delta T_{RX}(k) - \Delta T_{observed}(k)$$

Since the $\Delta T_{Rx}(k)$ and the $\Delta T_{observed}(k)$ are both the relative time difference between the transmission device 1A and the reception device 2A, it can be understood that time synchronization between the transmission device 1A and the reception device 2A is not required in the present embodiment.

The network estimation unit 25A performs the calculation for a plurality of packets to generate a time-series jitter pattern sequence. Then, the network estimation unit 25A inputs the jitter pattern sequence to the learning model and outputs the state index, similarly to the first embodiment.

Others are the same as those of the first embodiment, so the description is omitted here.

Figure 7:
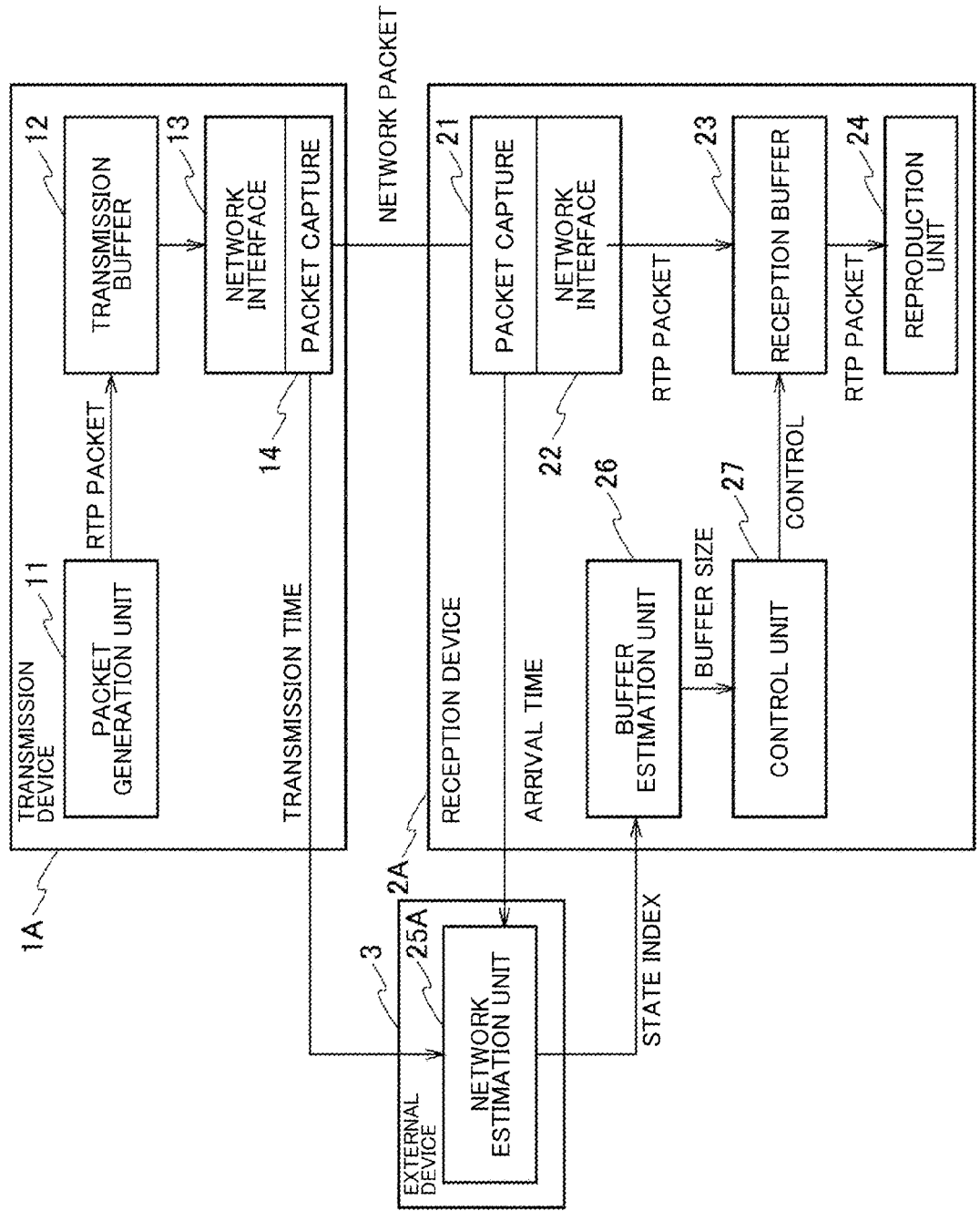
FIG. 7 is a diagram illustrating a configuration example of the transmission system of a modification example of the second embodiment.

FIG. 7 shows a configuration example of the transmission system of a modification example of the second embodiment. In this modification, the network estimation unit 25 is provided not in the reception device 2 but in an external device 3. The others are the same as the second embodiment.

The transmission system of the first and second embodiments described above includes the calculation unit 251 for calculating a jitter pattern sequence of a plurality of packets transmitted by the transmission devices 1 and 1A via a network using a transmission interval of the plurality of packets and a difference between arrival times when the packets arrive at the reception devices 2 and 2A, the generation unit 252 for inputting the jitter pattern sequence to the learning model 254 and generating a state index indicating the state of the network, and the buffer estimation unit 26 for determining the buffer size of the reception buffer 23 of the reception devices 2 and 2B based on the state index.

Thus, in the present embodiment, the transmission performance can be improved in accordance with the state of the network. Specifically, the buffer size is optimized according to the state of the network, and the waiting time is changed to suppress the occurrence of overflow in the congestion state, Thus, low-delay transmission in a stable state can be attained.

In the present embodiment, network estimation units 25 and 25A acquire transmission intervals and arrival intervals of packets in the transmission devices 1 and 1A and the reception devices 2 and 2A, input a jitter pattern which is a variation in delay time difference to a learning model, and estimate and indexes the state of the network from transmission information which can be acquired at the time of transmission. Thus, in the present embodiment, even in a case where the user cannot obtain the information of the entire network, the transmission system of the present embodiment can be used by transmitting the transmission interval together with the transmission data by the transmission device 1.

In addition, since the jitter pattern can be calculated not by absolute time but by relative time in each of the devices 1, 1A, 2 and 2B, the jitter pattern can be utilized even if time synchronization is not performed between the transmission device 1 and 1A and the reception device 2 and 2A.

In addition, the network estimation units 25 and 25A may be incorporated into the reception devices 2 and 2A or may be incorporated into the external device 3. In the former case, except acquisition of the transmission intervals transmitted from the transmission devices 1 and 1A can be completed within the reception device 2, and an improvement in stability can be expected. On the other hand, in the latter case, since the state index of the network is generated externally, the dependency of the reception devices 2 and 2A on a computing unit performance is reduced, and the expansion of the utilization range of the transmission system of this embodiment can be expected. In the latter case, it is also possible to expect extendability such as integration and processing of route information of a plurality of terminals such as multicast.

In the present embodiment, since the buffer size is optimized using the state index of the network, it is not necessary to set a constant large buffer size, and the delay can be reduced in the stable state of the network. On the other hand, even when the state is changed to the congestion state while transmission in accordance with the stable state is performed, the buffer size can be controlled without disturbing the video.

In this embodiment, the buffer size is optimized by feedback control or enhanced learning. In the case of a device having high computing element performance, highly flexible optimization is performed in real time by feedback control, and in an apparatus having low computing performance, processing can be selected in consideration of apparatus performance, such as reinforcing learning from data sampled through actual use and obtaining and using a weight corresponding to a path, and utilization in various apparatuses can be expected.

As the control of the other buffer size, a threshold value for the state index of the network may be set, and the buffer size may be set stepwise according to the state.

Figure 8:
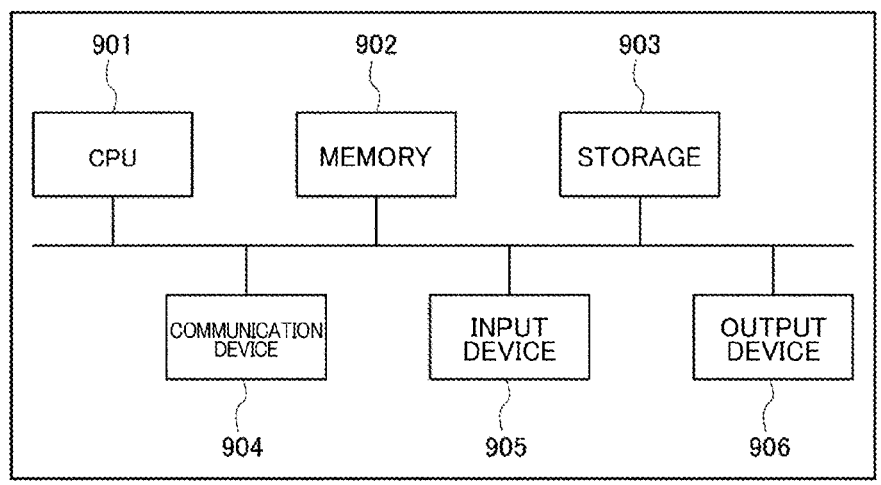
FIG. 8 is a hardware configuration example.

For the transmission devices 1 and 1A, the reception devices 2 and 2A, and the external device 3 described above, for example, a general-purpose computer system as shown in FIG. 8 can be used. The illustrated computer system includes a central processing unit (CPU, processor) 901, a memory 902, a storage 903 (HDD: Hard Disk Drive, SSD: Solid State Drive), a communication device 904, an input device 905, and an output device. 906. The memory 902 and the storage 903 are storage devices. In this computer system, each function of each device is realized by the CPU 901 executing a predetermined program loaded on the memory 902. For example, in a case of the transmission device program, the functions of the transmission devices 1 and 1A and the reception devices 2 and 2A are realized by each of the CPUs of the transmission device 1 and 1A, and in a case of the reception device program, the functions are realized by each of the CPUs of the reception devices 2 and 2A.

In addition, these devices 1, 1A, 2, 2B, and 3 may be implemented by one computer, or may be implemented by multiple computers. Also, these devices 1, 1A, 2, 2B, and 3 may be virtual machines implemented in computers. The transmission device program, the reception device program, and the external device program can be stored in a computer-readable recording medium such as HDD, SSD, a universal serial bus (USB) memory, a compact disc (CD), a digital versatile disc (DVD), or distributed via a network.

Note that the present invention is not limited to the above embodiment and many modifications can be made within the scope of the gist thereof.

For example, in the present embodiment, the transmission is controlled by optimizing the buffer size of the reception buffer 23, but other transmission control may be performed. For example, redundant transmission, introduction of an error correction code, and the like may be considered. In this case, the state index outputted from the network estimation unit 25 is transmitted not to the reception device 2 but to the transmission device 1. The transmission device 1 includes a control unit that determines the presence or absence of redundant transmission or determines an error correction coding system based on the state index, and generates control information for controlling the transmission device 1 with the determined content. Further, the control unit may select a path for redundant transmission, or may determine the adoption of an encoding system capable of coping with a high error rate. The redundancy transmission improves the stability of transmission. In this case, the network state estimation unit 25 may be provided on the side of the transmission device 1. Further, as the transmission control, a control unit for outputting an alert when the state of the network estimated from the state index is bad may be provided.

REFERENCE SIGNS LIST

1: Transmission device
11: Packet generation unit
12: Transmission buffer
13: Network interface
14: Packet capture
2: Reception device
21: Packet capture
22: Network interface
23: Reception buffer
24: Reproduction unit
25: Network estimation unit
251: Calculation unit
252: Generation unit
253: Learning unit
254: Learning model (neural network)
26: Buffer estimation unit
27: Control unit

The invention claimed is:

1. A transmission system comprising:
a calculation unit, including one or more processors, configured to calculate a jitter pattern sequence of a plurality of packets transmitted by a transmission device via a network using a transmission interval of the plurality of packets and a difference between arrival times at which the packets arrive at a reception device;
a generation unit, including one or more processors, configured to input the jitter pattern sequence to a first learning model to generate a state index indicating a state of the network; and
a buffer estimation unit, including one or more processors, configured to input the state index to a second learning model to determine a buffer size of a reception buffer of the reception device based on the state index.

2. The transmission system according to claim 1, further comprising:
a control unit, including one or more processors, configured to update the buffer size of the reception buffer to the buffer size determined by the buffer estimation unit.

3. The transmission system according to claim 1, wherein the calculation unit is configured to acquire a predetermined constant transmission interval or a plurality of transmission times when the transmission device transmits a plurality of the packets from the transmission device, and
in a case of acquiring the transmission time, the calculation unit is configured to calculate the jitter pattern sequence using a difference between the transmission times.

4. The transmission system according to claim 1, wherein the first learning model is a neural network generated by performing unsupervised learning using a slack time zone of the network as learning data, or by performing unsupervised learning in which labels are attached to the transmission interval collected from the transmission device and the arrival time collected from the reception device.

5. A transmission method performed by a transmission system, the method comprising:
calculating a jitter pattern sequence of a plurality of packets transmitted by a transmission device via a network using a transmission interval of the plurality of packets and a difference between arrival times at which the packets arrive at a reception device,
inputting the jitter pattern sequence to a first learning model to generate a state index indicating a state of the network, and
acquiring an observation value output from a reception buffer, and determining a buffer size of the reception buffer of the reception device based on the state index by using a deviation between the observation value or an estimation value estimated from the observation value and the state index.

6. The transmission method according to claim 5, further comprising:
updating the buffer size of the reception buffer to the determined buffer size.

7. The transmission method according to claim 5, further comprising:
acquiring a predetermined constant transmission interval or a plurality of transmission times when the transmission device transmits a plurality of the packets from the transmission device, and
in a case of acquiring the transmission time, calculating the jitter pattern sequence using a difference between the transmission times.

8. The transmission method according to claim 5, wherein the first learning model is a neural network generated by performing unsupervised learning using a slack time zone of the network as learning data, or by performing unsupervised learning in which labels are attached to the transmission interval collected from the transmission device and the arrival time collected from the reception device.

9. A non-transitory computer-readable storage medium storing a transmission program for causing a computer to perform operations comprising:
calculating a jitter pattern sequence of a plurality of packets transmitted by a transmission device via a network using a transmission interval of the plurality of packets and a difference between arrival times at which the packets arrive at a reception device,
inputting the jitter pattern sequence to a first learning model to generate a state index indicating a state of the network, wherein the first learning model is a neural network generated by performing unsupervised learning using a slack time zone of the network as learning data, or by performing unsupervised learning in which labels are attached to the transmission interval collected from the transmission device and the arrival time collected from the reception device, and
determining a buffer size of a reception buffer of the reception device based on the state index.

10. The non-transitory computer-readable storage medium according to claim 9, wherein the operations further comprise:
updating the buffer size of the reception buffer to the determined buffer size.

11. The non-transitory computer-readable storage medium according to claim 9, wherein the operations further comprise:
acquiring a predetermined constant transmission interval or a plurality of transmission times when the transmission device transmits a plurality of the packets from the transmission device, and in a case of acquiring the transmission time, calculating the jitter pattern sequence using a difference between the transmission times.

12. The non-transitory computer-readable storage medium according to claim 9, wherein the operations further comprise:
inputting the state index to a second learning model to determine the buffer size of the reception buffer.

13. The non-transitory computer-readable storage medium according to claim 9, wherein the operations further comprise:
acquiring an observation value output from the reception buffer, and determining the buffer size of the reception buffer using a deviation between the observation value or an estimation value estimated from the observation value and the state index.

* * * * *